United States Patent Office 3,275,597
Patented Sept. 27, 1966

3,275,597
STABILIZED POLYOLEFIN CONTAINING A MIXED ESTER OF A POLYFUNCTIONAL ALCOHOL WITH A PHENOL CARBOXYLIC ACID AND AN ALIPHATIC CARBOXYLIC ACID
Otto Mauz and Eberhard Prinz, Frankfurt am Main, Germany, assignors to Hercules Incorporated, a corporation of Delaware
No Drawing. Filed Sept. 16, 1963, Ser. No. 309,322
Claims priority, application Germany, Sept. 27, 1962, F 37,894
11 Claims. (Cl. 260—45.85)

The present invention relates to the stabilization of solid olefin polymers.

Under the action of atmospheric oxygen, polyolefins such as polyethylene and polypropylene undergo an oxidative degradation which is accelerated considerably at high temperatures or in the presence of light. Owing to this degradation, the mechanical properties, in particular the tensile strength, elongation, and toughness, and therefore the serviceability of articles manufactured from polyolefins, deteriorate considerably.

Numerous compounds have been proposed for the prevention or retardation of such degradation phenomena. Organic substances, in particular, amines, phenols, and thio compounds, are known to be effective stabilizers of polyolefins.

Most of the known stabilizers have several disadvantages which limit their use considerably under certain conditions. Thus compounds of the class of the amines, such as 4,4'-diaminodiphenylmethane or phenyl-$\beta$-naphthylamine derivatives, are excellent antioxidants. However, they have the great disadvantage that they discolor strongly at high temperatures and show in most cases a more or less intense toxicity. Phenol derivatives are inferior in their stabilizing action to the amines and also tend to discolor in the presence of air and light owing to their easy transition to quinoidal structures. Sulfur-containing compounds show by themselves little or no stabilizing action.

Often the effectiveness of the individual components can be increased considerably by combination, e.g., of thio compounds with phenols. The usefulness of the known stabilizer types is frequently restricted, however, by the fact that some stabilizers are poorly compatible with the plastics substrates and therefore, in particular, at higher temperatures, migrate or exude from the plastic substance. With stabilizer mixtures of synergistic action it is often observed that one of the components of the mixture or even both stabilizer components migrate from the plastic so that the stabilized object, deprived of its optimum stabilizer composition, embrittles prematurely.

It has now been found that polymers and copolymers of olefins can be stabilized against the action of light and oxygen by using as stabilizer 0.05 to 5% by weight, preferably 0.1 to 0.5% by weight, based on the polymer, of a mixed ester of a bi- or polyfunctional alcohol with 2 to 6 alcoholic hydroxyl groups and at least two different carboxylic acids (a) and (b) as follows:

(a) A carboxylic acid having a phenolic substituent, and
(b) A saturated or unsaturated aliphatic carboxylic acid.

The stabilizers according to the invention have the above-mentioned disadvantages not at all or only to a minor extent.

Compounds of stabilizing action according to the invention can be prepared by combining different phenol-containing carboxylic acids, which by themselves have no or only very little stabilizing action, with pure aliphatic or sulfur-containing aliphatic carboxylic acids by esterification with bi- or polyfunctional alcohols in one molecule. Such highly effective mixed esters can be prepared from any kind of bi- or polyfunctional alcohols as alcoholic component such as, e.g., ethylene glycol, 1,4-butane diol, dimethylolpropane, glycerin, hexanetriol, pentaerythritol, pentitol, hexitol, diglycol, and thiodiglycol.

The mixed esters must contain as acid components at least two different carboxylic acids, at least one of which must be a carboxylic acid of phenol character, i.e., comprising one or several phenolic OH— groups on one or several aromatic rings. Phenol carboxylic acids which can be used are, e.g., gallic acid, bis(4-hydroxyphenyl) alkanoic acids, and alkyl salicylic acids.

The carboxylic acids contained in the mixed esters as additional acid components can be: saturated or unsaturated aliphatic carboxylic acids with 4 to 20 C-atoms, e.g., stearic acid, oleic acid, n-butanoic acid, etc., thiocarboxylic acids formed by addition of $H_2S$ or a mercaptan to an unsaturated aliphatic carboxylic acid, and dialkylphosphon-alkanoic acids.

The mixed esters used as stabilizers according to the invention can contain more than two components depending upon the number of alcoholic OH— groups contained in the alcoholic component. Thus, for example, pentaerythritol can be esterified with four different acid components such as, e.g., stearic acid, sorbic acid, gallic acid, and dodecyl thiopropionic acid.

The stabilizers used in the process of the invention may be prepared, e.g., by heating equimolar mixtures of the esterification components in a nitrogen atmosphere with stirring to 200° C. and removing the water formed during the esterification by distillation during the reaction. It is frequently suitable to conduct the esterification in the presence of a hydrocarbon of relatively high boiling point, e.g., toluene, and to remove the water formed during the reaction by azeotropic distillation. The mixed esters prepared in this way are not normally uniform compounds; they consist as a rule rather of a mixture of different mixed esters. Compounds of uniform structure are obtained when the esterification of the polyalcohols is carried out with the different carboxylic acids in two or more reaction steps, depending upon the number of carboxylic acid components.

However, the uniformity of the mixed esters is generally not essential to their effectiveness, so that the more convenient one-stage process can be used for their preparation.

The intramolecular combinations used according to the invention, which can be prepared by esterification of phenol carboxylic acids together with aliphatic fatty acids with bi- or polyfunctional alcohols, have to our surprise an excellent action as polyolefin stabilizers, although the individual components of the respective mixed esters in the form of free acids or in the form of low or higher monoesters per se are little effective or not effective at all, and show also mixed with each other only a low synergistic effect. It is thereby particularly remarkable that such mixed esters are considerably more effective than the simple esters prepared from the corresponding phenol carboxylic acids with higher monofunctional aliphatic alcohols, although the percentage proportion by weight of effective phenolic OH— groups in the mixed esters of higher molecular weight is considerably lower than in the corresponding monoesters.

The special effectivness of such mixed esters in comparison with the corresponding mixture of their simple esters can probably be traced primarily to the longer aliphatic hydrocarbon residues existing in the mixed esters of higher molecular weight which effect a higher compatibility of the mixed esters with the polyolefins.

The excellent activity of the mixed esters containing esters of thiocarboxylic acid compared with the mixture of pure or simply esterified acid components seems to be obtained not only because of the greater compatibility of these compounds with the polyolefins but also because of the fact that the synergistic effect of phenolic and thio-ether groups known per se is increased by their coupling in one molecule.

The stabilizers of the invention are added to the polyolefins in a concentration from 0.01 to 5%, preferably 0.1 to 0.5%, by weight of the polymer, with optional addition of further stabilizers or other additives such as UV-absorbents, lubricants, fillers, dyes, etc. The stabilizers are mixed with the polyolefins most suitable via a stabilizer stock solution which contains the stabilizer in a relatively high concentration. For the preparation of such stock solutions, a concentrated solution of the stabilizer is mixed in a low-boiling solvent such as e.g., acetone or methylene chloride, and added to the powdery polyolefin to be stabilized in a quantitative ratio such that the mixture contains after evaporation of the solvent about 30 to 40% by weight of stabilizer. This powdery polyolefin-stabilizer concentrate can then be mixed with the polyolefin to be stabilized in different quantitative ratios, so that a polyolefin of any stabilizer content desired can be prepared.

The stabilizer may naturally be added also during the preparation of the polymerization products or during their further processing. This method of working has the special advantage that the polymer is protected at an early stage of manufacture, i.e., during the preparation or subsequent processing procedure, against the influence of light and atmospheric oxygen, particularly at higher temperatures.

The polyolefins stabilized in this way can be processed by the known formation methods, e.g., compression, injection, and extrusion molding.

The following examples illustrate the superiority of the effectiveness of the stabilizers claimed here:

EXAMPLES

A 1% acetone solution of the stabilizers and stabilizer components summarized in Table 1 was mixed with polypropylene powder in such a quantitative ratio that the stabilizer concentration based on polypropylene amounted to 0.5% by weight. The stabilized polypropylene powder was dried under vacuum at 50° C. and then molded to round plates 1 mm. thick and 120 mm. in diameter. From each plate several test strips of 10 mm. width and 100 mm. length each were punched out, suspended in a drying oven, and tempered at 140° C. with access of air. The embrittlement time was determined as the measure of the heat stability. The embrittlement time is the time in days after which the test strips stored at 140° C. break when bent 180°, or show the beginning of a powdery decomposition, which is particularly characteristic of polypropylene (see Table 1).

For comparison, Table 2 gives embrittlement times of polypropylene test strips which had been stabilized with the initial components of the mixed esters summarized in Table 1.

The two tables show clearly that the components alone show practically no stabilizing effect but that by esterification of the above-mentioned carboxylic acid mixtures with polyfunctional alcohols an extraordinary increase in effectiveness is obtained.

The test results summarized in Table 3 show that the mixtures of the carboxylic acids contained in the mixed esters as well as the mixtures of the corresponding methyl esters of carboxylic acids compared with the respective mixed esters have no or only a very slight effect. Furthermore, the values show clearly that the sulfur-containing, as well as the sulfur-free, mixed esters are likewise considerably superior in their effect to the monoesters of the corresponding phenol carboxylic acid with higher aliphatic alcohols.

*Table 1*

| Stabilizer | Concentration (percent by weight) | Embrittlement Time in Days at 140° C. |
|---|---|---|
| 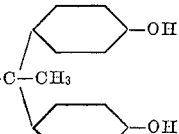 | 0.5 | 50 |
| 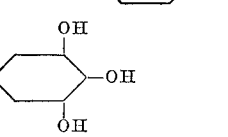 | 0.5 | 43 |
| 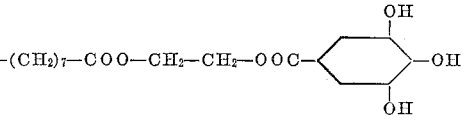 | 0.5 | 38 |

*Table I*—Continued

| Stabilizer | Concentration (percent by weight) | Embrittlement Time in Days at 140° C. |
|---|---|---|
| n-C₁₂H₂₅—S—CH₂—CH₂—COO—CH₂—CH₂—OOC—CH₂—CH₂—C(CH₃)(cyclohexyl-CH₃-OH)(cyclohexyl-CH₃-OH) | 0.5 | 45 |
| n-C₁₈H₃₇—S—CH₂—CH₂—COO—CH₂—CH₂—OOC—CH₂—CH₂—C(CH₃)(cyclohexyl-OH)(cyclohexyl-OH) | 0.5 | 60 |
| n-C₁₈H₃₇—S—CH₂—CH₂—COO—CH₂—CH₂—S—CH₂—CH₂—OOC—(cyclohexyl-(OH)₃) | 0.5 | 57 |
| n-C₁₈H₃₇—S—CH₂—CH₂—COO—CH₂—CH—CH₂—OOC—CH₂—CH₂—S—C₁₈H₃₇, with OOC—(cyclohexyl-(OH)₃) branch | 0.5 | 60 |
| Pentaerythritol derivative: CH₃—C[CH₂—OOC—CH₂—CH₂—S—C₁₈H₃₇][CH₂—OOC—(CH₂)₇—CH=CH—(CH₂)₇—CH₃][CH₂—OOC—CH₂—CH₂—C(CH₃)(cyclohexyl-OH)(cyclohexyl-OH)] | 0.5 | 38 |
| C₁₈H₃₇—S—CH₂—CH₂—COO—CH₂—C[CH₂—OOC—(cyclohexyl-OH-C₈H₁₇)]₂—CH₂—OOC—CH₂—CH₂—S—C₁₈H₃₇ | 0.5 | 38 |
| C₁₈H₃₇—S—CH₂—CH₂—COO—CH₂—CH—CH₂—OOC—(cyclohexyl-(OH)₃), with O—C(=O)—CH₂—CH₂—P(=O)(OC₂H₅)₂ branch | 0.5 | 40 |
| (HO-cyclohexyl)₂C(CH₃)—CH₂—COO—CH₂—CH(O—C(=O)—C₁₇H₃₅)—OOC—CH₂—CH₂—S—C(=N)(NH)(cyclohexyl) | 0.5 | 57 |

Table 2

| Compound | Concentration (Percent by wt.) | Embrittlement Time at 140° C. |
|---|---|---|
| Glycol | 0.5 | Several hours. |
| Glycerin | 0.5 | Do. |
| Pentaerythritol | 0.5 | Do. |
| Oleic acid | 0.5 | Do. |
| Stearic acid | 0.5 | Do. |
| n-Octadecyl-thiopropionic acid | 0.5 | About 1 day. |
| Benzothiazole-thiopropionic acid | 0.5 | Do. |
| 4,4-bis(4-hydroxyphenyl) pentanoic acid | 0.5 | Do. |
| Gallic acid | 0.5 | Do. |

Table 3

| Compound | Concentration [1] (percent by weight) | Embrittlement Time in Days at 140° C. |
|---|---|---|
| n-$C_{12}H_{25}$—S—$CH_2$—$CH_2$—COO—$CH_2$—$CH_2$—OOC—$CH_2$—$CH_2$—C(—$C_6H_4$—OH)(—$C_6H_4$—OH)—$CH_3$ | 0.5 | 21 |
| n-$C_{12}H_{25}$—S—$CH_2$—$CH_2$—COOH plus 4,4-bis(4-hydroxyphenyl)-pentanoic acid | 0.5 | 2 |
| 4,4-bis(4-hydroxyphenyl)-pentanoic acid dodecyl ester | 0.5 | 12 |
| n-$C_{12}H_{25}$—S—$CH_2$—$CH_2$—COO$CH_3$ plus 4,4-bis(4-hydroxyphenyl)pentanoic acid methyl ester | 0.5 | 2 |
| n-$C_{12}H_{25}$—S—$CH_2$—$CH_2$COO—$(CH_2)_2$—OOC—$C_6H_2$(OH)$_3$ | 0.5 | 43 |
| n-$C_{12}H_{25}$—S—$CH_2$—$CH_2$—COOH plus gallic acid | 0.5 | 5/6 |
| n-$C_{12}H_{25}$—S—$CH_2$—$CH_2$—COO—$CH_3$ plus gallic acid methyl ester | 0.5 | 5 |
| Gallic acid dodecyl ester | 0.5 | 12 |
| $CH_3$—$(CH_2)_{10}$—COO—$(CH_2)_2$—OOC—$C_6H_2$(OH)$_3$ | 0.5 | 38 |
| $CH_3$—$(CH_2)_{10}$—COOH + HOOC—$C_6H_2$(OH)$_3$ | 0.5 | 5–6 |
| $CH_3$—$(CH_2)_{10}$—COO$CH_3$ + $CH_3$—OOC—$C_6H_2$(OH)$_3$ | 0.5 | 4–5 |
| $CH_3$—$(CH_2)_{11}$—OOC—$C_6H_2$(OH)$_3$ | 0.5 | 12 |

[1] Total concentration of equimolar mixtures of the individual components.

What we claim and desire to protect by Letters Patent is:

1. A solid polymer of a monolefin containing as a stabilizer from 0.05 to 5% by weight of a mixed ester of a polyfunctional alcohol having 2 to 6 hydroxyl groups with at least 2 different carboxylic acids, 1 of said acids being a phenol monocarboxylic acid selected from the group consisting of gallic acid, bis-(4-hydroxyphenyl) alkanoic acids, and alkyl salicylic acids, and the other being an aliphatic monocarboxylic acid.

2. The composition of claim 1 in which the polyolefin is polypropylene.

3. The composition of claim 1 in which the phenol carboxylic acid is gallic acid.

4. The composition of claim 1 in which the phenol carboxylic acid is a bis(hydroxyphenyl) alkanoic acid.

5. The composition of claim 1 in which the phenol carboxylic acid is an alkyl salicylic acid.

6. The composition of claim 1 in which the aliphatic carboxylic acid is a fatty acid.

7. The composition of claim 1 in which the aliphatic carboxylic acid is a thiocarboxylic acid.

8. The composition of claim 1 in which the aliphatic carboxylic acid is a dialkylphosphon-alkanoic acid.

9. The composition of claim 1 in which the alcohol is a glycol.

10. The composition of claim 1 in which the alcohol is glycerine.

11. The composition of claim 1 in which the alcohol is pentaerythritol.

References Cited by the Examiner

UNITED STATES PATENTS

| | | | |
|---|---|---|---|
| 2,865,954 | 12/1958 | Dehm | 260—31.6 |
| 2,891,089 | 6/1959 | Jolly | 260—31.6 |

LEON J. BERCOVITZ, *Primary Examiner.*

G. W. RAUCHFUSS, *Assistant Examiner.*